United States Patent Office 2,710,884
Patented June 14, 1955

---

2,710,884

PRODUCTION OF METHALLYL ALCOHOL AND ALPHA-METHACROLEIN

Howard R. Guest, South Charleston, and Ben W. Kiff, Ona, W. Va., assignors to Union Carbide and Carbon Corporation, a corporation of New York No Drawing. Application May 28, 1952, Serial No. 290,558

5 Claims. (Cl. 260—601)

This invention relates to the production of methallyl alcohol and alpha-methacrolein; and more especially it concerns a novel process for the production of these compounds with good yields from 2,3-dihydro-2,5-dimethyl-1,4-pyran-2-methanol, which, in turn, is produced from methacrolein by known processes including the dimerization of the methacrolein to form 2,3-dihydro-2,5-dimethyl-2-formyl-1,4-pyran and the hydrogenation of the latter under conditions converting it to 2,3-dihydro-2,5-dimethyl-1,4-pyran-2-methanol.

Methallyl alcohol is commonly used as an intermediate for the preparation of esters that are readily polymerizable, alone or in conjunction with other polymerizable materials, to produce useful polymers and copolymers. However, the efforts to expand uses for methallyl alcohol have been hampered both by its relatively high cost and its limited availability in commercial quantities.

Various methods have been proposed for the production of methallyl alcohol. One involves the reaction of aluminum isopropoxide with methacrolein in the presence of isopropanol. Aluminum methallyloxide is formed, and an equivalent amount of acetone is formed and distilled off during the reaction. The methallyl alcohol then is liberated by the addition of a dilute mineral acid, and must be extracted from the resultant aqueous solution with a water-immiscible solvent. This method has the disadvantages (1) of consuming an amount of aluminum isopropoxide equivalent to the methallyl alcohol produced, (2) of producing by-product acetone, and (3) of involving tedious and complicated operations.

Another method for making methallyl alcohol involves passing a mixture of methacrolein and a primary or secondary aliphatic alcohol over a mixed metal oxide catalyst. This method has the disadvantages that it requires a large excess of the alcohol (10 mols to one mol of the methacrolein) with the formation of a co-product aldehyde or ketone corresponding to the alcohol used.

A third method involves the reaction of methallyl chloride with an aqueous sodium hydroxide solution at 100° C.-150° C., and pressures up to 250 pounds per square inch. It has the disadvantages of consuming amounts of sodium hydroxide and chlorine equivalent to the alcohol produced. Some methallyl ether is produced which forms with the methallyl alcohol an azeotropic mixture having a boiling point almost identical with that of the pure alcohol, thus complicating the purification of the latter.

The present invention concerns a process for making methallyl alcohol which, unlike prior methods, offers the important advantages of using only methacrolein and hydrogen as raw materials and of involving a reaction wherein the only by-product produced in substantial amounts is methacrolein which then can be used directly in the production of the starting material.

Among the more important objects of the invention are: the production in novel manner of methallyl alcohol in simple manner from readily available starting materials; and the production from 2,3-dihydro-2,5-dimethyl-1,4-pyran-2-methanol of good yields of methallyl alcohol together with methacrolein that is readily convertible by known procedures to the starting material in the process.

In accordance with this invention the vapors of 2,3-dihydro-2,5-dimethyl-1,4-pyran-2-methanol, or a vaporous mixture containing the same in admixture with a gaseous or vaporous diluent such as nitrogen, steam, or methane, which diluent is inert to the starting material and to the reaction products under the conditions of the reaction, are passed through a reaction zone or tube maintained at a temperature within the range from around 350° C. to around 600° C. and preferably between 475° C.-525° C. In operations conducted at around the optimum reaction temperatures, the presence of an inert diluent often is especially advantageous. The reaction zone preferably is packed with an inert solid refractory contact material such as fused aluminum oxide adapted to facilitate the uniform heating of the vapors to the desired temperature during the brief dwell of the vapors in the reaction zone. Other well-known types of inert refractory packing materials for the reaction zone also can be used, as, for example one-quarter inch glass rings, and similar silicates, and the various bonded silicas such as those being marketed under the trade name "Filtros." These materials conveniently can be present in sizes passing a 2-mesh sieve but retained on a 4-mesh screen, although these sizes obviously are not critical. The alcohol starting material can be vaporized previous to its entry into the reaction tube, or it can be vaporized at the entrance of the tube.

The use in the pyrolysis of temperatures substantially below 350° C. has been found to give impracticably low yields of methallyl alcohol, while temperatures much above 600° C. have caused the formation of appreciable amounts of low molecular weight hydrocarbons and a small amount of tarry materials, as well as carbon monoxide and hydrogen. The use of higher pyrolysis temperatures within this range with shorter times of contact are facilitated by the use of inert gaseous diluents in the vapors undergoing pyrolysis. Thus, the dilution of the alcohol vapors flowing to the pyrolysis zone with equal volumes of methane to give a contact time of 8 seconds gave excellent yields of methallyl alcohol, as shown in Example 3.

The pyrolysis reaction zone usually is maintained under atmospheric pressure, although higher or lower pressures can be effectively used. The resultant vaporous products are promptly withdrawn from the reaction zone as formed and are condensed in suitable manner and recovered, any uncondensable vapors and/or inert diluents being vented from the condenser.

The condensate is fractionally distilled, and the methacrolein and methallyl alcohol present therein are separately condensed and recovered. The methacrolein is separated first, after which the methallyl alcohol is separated in a substantially pure state from the high boiling residue which is largely unreacted 2,3-dihydro-2,5-dimethyl-1,4-pyran-2-methanol suitable for reuse in the process. After removal of the methallyl alcohol, this unreacted starting material is distilled off at a temperature of 86° C.-87° C. under an absolute pressure of 10 millimeters of mercury, and separately recovered.

The reaction involved in the pyrolysis may be represented by the equation:

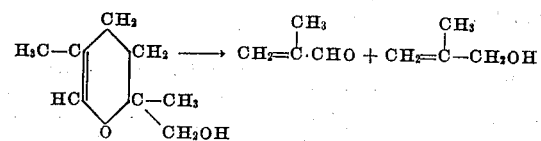

The starting material can be made by the catalytic hydrogenation of the methacrolein dimer, also known as 2,5-dimethyl-2,3-dihydro-2-formyl-1,4-pyran, conducted in various ways, for example, in the liquid phase at temperatures around 150° C. under pressures around 100 pounds per square inch in the presence of a barium-promoted copper-chromium catalyst. Such a catalyst is being marketed under the trade name, "Harshaw No. Cu-0401P," and contains 51% cupric oxide, 37% chromium oxide and 12% barium oxide. The same reaction can be conducted at 130° C.–180° C. under 2,000 pounds per square inch, using a less active copper-chromium catalyst, such as that now being marketed under the trade name "Harshaw No. Cu-0202P," which contains 78%–80% cupric oxide, the balance being chromic oxide. In each instance the yield of 2,3-dihydro-2,5-dimethyl-1,4-pyran-2-methanol is almost quantitative.

The aforesaid methacrolein dimer can be formed readily in a Diels-Alder type of reactor by heating to 150° C. for 16 hours in a closed reaction vessel undiluted methacrolein containing a small amount, e. g., 1%, of a suitable polymerization inhibitor such as hydroquinone, resorcinol, pyrogallol, the nitrophenols, and other well-known polymerization inhibitors for vinyl type compounds. The reaction develops an autogenous pressure around 150 pounds per square inch. However, the reaction occurs at a slow rate even at room temperature when the methacrolein contains 1% of a polymerization inhibitor.

The following examples will serve to illustrate certain embodiments of the invention:

*Example 1*

The vapors of 655 grams of 2,3-dihydro-2,5-dimethyl-1,4-pyran-2-methanol were fed at a uniform rate over a period of 7 hours through a stainless steel tube one inch in inner diameter and 36 inches long, completely jacketed with an electrically heated reservoir containing a molten salt mixture. The tube was packed with 400 cc. of a commercial grade of fused aluminum oxide being marketed under the trade name, "Aloxite," and having particle sizes passing a 2-mesh screen but retained on a 4-mesh screen. The molten salt mixture and the tube contents were heated to 500° C. The rate of flow of the vapors through the tube was such that the vapors were in contact with the hot aluminum oxide in the tube for about 15 seconds. The vaporous reaction products then were withdrawn from the reaction zone and condensed in a water-cooled condenser, 631 grams of the reaction mixture being thus collected, any uncondensed materials being withdrawn through a trap refrigerated to 0° C. The resultant condensate was fractionally distilled, yielding 304 grams of methallyl alcohol, 277 grams of methacrolein, and 28 grams of unreacted 2,3-dihydro-2,5-dimethyl-1,4-pyran-2-methanol. This corresponded to a yield of 91.6% of methallyl alcohol and an efficiency of 95.7%.

*Example 2*

Employing the apparatus described in Example 1, a total of 638 grams of 2,3-dihydro-2,5-dimethyl-1,4-pyran-2-methanol were fed during 11 hours through the reaction zone of the tube held at 545° C., providing a contact time of 15 seconds for the vapors in the heated reaction zone. The effluent vapors were condensed in a water-cooled condenser, yielding 515 grams of condensate which, upon fractional distillation, yielded 195 grams of methallyl alcohol, 244 grams of methacrolein and 24 grams of unreacted starting material. This corresponds to a yield of methallyl alcohol of 60.2% with an efficiency of 62.7%.

*Example 3*

Following the procedure and using the apparatus described in Example 1, with the exception that a stream of methane was fed with the alcohol starting material into the reaction tube at the rate of 15 liters of methane per hour so that the contact time for the alcohol vapors in the heated reaction zone was 8 seconds, a total of 598 grams of 2,3-dihydro-2,5-dimethyl-1,4-pyran-2-methanol fed at a steady rate through the tube during 6.75 hours yielded 576 grams of condensate which, upon fractional distillation, yielded 292 grams of methallyl alcohol, 245 grams of methacrolein and 13 grams of unreacted starting material. This corresponds to a yield of methallyl alcohol of 96.1% and an efficiency of 98.3%.

Following the procedure and conditions recited and using the apparatus described in this Example 3, with the exception that nitrogen was used as the inert diluent in place of the methane, a yield of 93.5% of methallyl alcohol and an efficiency of 96.6% were secured.

Similarly, when substituting superheated steam as the diluent in the example in place of methane, a yield of 89.9% of methallyl alcohol was secured at an efficiency of 93.5%.

*Example 4*

Employing the apparatus described in Example 1, but wherein the reaction tube was packed with ¼-inch glass rings in place of the "Aloxite" used in Example 1, vapors of 383 grams of 2,3 - dihydro-2,5-dimethyl - 1,4-pyran - 2-methanol were fed at a uniform rate during 7 hours through the reaction zone maintained at 500° C., a contact time of 26 seconds for the vapors in the reaction zone being provided. Upon condensing the effluent from the reaction tube in a water-cooled condenser, a total product yield of 370 grams of condensate was secured. Fractional distillation of this condensate yielded 177 grams of methallyl alcohol, 167 grams of methacrolein and 14 grams of unchanged starting alcohol. This corresponds to a yield of methallyl alcohol of 91.3% at an efficiency of 94.7%.

Following the procedure and conditions recited and using the apparatus described in Example 4, with the exception that there was substituted for the glass rings an equivalent amount of a silicate-bonded silica being marketed under the trade name, "Filtros," a yield of 88.6% of methallyl alcohol at an efficiency of 92.4% was secured.

The invention is susceptible of modification within the scope of the appended claims.

We claim:

1. Process for producing methallyl alcohol and alpha-methacrolein which comprises pyrolyzing 2,3-dihydro-2,5-dimethyl-1,4-pyran-2-methanol at a temperature within the range between around 350° C. and around 600° C., and recovering methallyl alcohol and alpha-methacrolein from the resultant reaction products.

2. Process for producing methallyl alcohol, which comprises pyrolyzing successive portions of a vaporous stream of 2,3-dihydro-2,5-dimethyl-1,4-pyran-2-methanol, at a temperature within the range between around 350° C. and around 600° C., condensing the resultant vaporous reaction products, and recovering methallyl alcohol from the condensate.

3. Process as defined in claim 2 wherein the vaporous stream of the said alcohol contains an inert fluid diluent which is inert to the said alcohol and to the reaction products under the conditions of the pyrolysis.

4. Process for producing methallyl alcohol and alpha-methacrolein, which comprises pyrolyzing vapors of 2,3-dihydro-2,5-dimethyl-1,4-pyran-2-methanol in a reaction zone maintained at a temperature within the range between around 475° C. and around 525° C., in the presence of an inert refractory contact material.

5. Process for producing methallyl alcohol, which comprises conducting successive portions of a flowing mixture of vapors of 2,3-dihydro-2,5-dimethyl-1,4-pyran-2-methanol and an inert non-liquid fluid diluent for such vapors through a pyrolysis zone maintained at a temperature within the range between around 475° C. and around 525° C., condensing the resultant reaction products, and recovering methallyl alcohol from the condensate.

(References on following page)

References Cited in the file of this patent

UNITED STATES PATENTS

| | | |
|---|---|---|
| 2,479,283 | Whetstone | Aug. 16, 1949 |
| 2,577,445 | Bortnick | Dec. 4, 1951 |

FOREIGN PATENTS

| | | |
|---|---|---|
| 573,507 | Great Britain | Nov. 23, 1945 |

OTHER REFERENCES

Wilson: "Jour. Am. Chem. Soc.," vol. 69 (1947), pp. 3004–3006.